Patented Apr. 20, 1926.

1,581,317

UNITED STATES PATENT OFFICE.

RALPH KIRKMAN, OF BROOKLYN, NEW YORK.

CUTICLE REMOVER.

No Drawing. Application filed May 15, 1925. Serial No. 30,637.

*To all whom it may concern:*

Be it known that I, RALPH KIRKMAN, a citizen of the United States, residing at Brooklyn, in the county of Kings and State of New York, have invented certain new and useful Improvements in Cuticle Removers, of which the following is a specification.

This invention relates to cuticle removers, and was developed because of certain objections noted in cuticle removers now on the market.

The most effective of the known removers comprises essentially a weak solution of potassium hydroxide or potash in water, usually about two per cent. Potash has the property of attacking and disintegrating organic matter. A solution stronger than three per cent would have too great an effect, but a solution from one and one-half per cent to three per cent in strength, if applied to the cuticle around the nails devitalizes the tissue so that it can easily be removed or pushed back into place. Such a liquid composition presents certain objectionable features, and in an endeavor to overcome these I have been led to make a remover in paste form, which, because of its paste form, and because of its novel characteristics incidental and or necessary to producing the paste form, is very effective for its intended purposes.

I have devised a formula and process for making such a cuticle remover, as follows:

I use:

| | Per cent. |
|---|---|
| Alkaline starch | 6 |
| Glycerine c. p. | 8 |
| Potassium hydroxide | 2 |
| Water | 84 |

The potash is weighted out and added to about one-fourth of the water and thoroughly dissolved.

The remainder of the water is added to all of the glycerine and all of the starch and thoroughly stirred. The potash and water are then added quickly to the mixture of glycerine, starch and water, stirred thoroughly, and then heated in a double boiler and raised slowly in temperature, stirring all the while, until "starching" (bursting of the starch granules) is complete. The paste is heated on above the starching point, up to about 170° F. to insure complete starching.

It is important that the starching should not take place until all ingredients are thoroughly mixed so as to render the mixture homogeneous. Because potash has the same effect as heat in causing "starching" the adding of the potash and water to the remaining ingredients is the critical point, as the potash may cause partial "starching" and thus make the mass heterogeneous. Having all ingredients cool before the final mixing, pouring quickly and stirring as you pour, will help prevent the partial "starching". The presence of the glycerine also helps, as experiment showed that the more glycerine used the more heat is needed to produce starching.

The important feature of the invention is in the fact that the product is in paste form, and that starch, and particularly an alkaline starch, is used as a thickener.

Where a liquid product is used, the liquid does not stay where it is applied, but, being of the same consistency as water, has a tendency to run all over the end of the fingers, especially if applied too copiously. The paste form stays where it is put, and thus its chemical action is confined to the point where it is needed. Cuticle removers depend for their effectiveness upon a chemical action which, if carried too far, will cause pain (as on a chapped or raw surface) and have probably been the starting point of infections. Hence the advantage of confining their action is obvious.

Were the cuticle at the base of the nail is in a hard, chapped condition, a liquid remover, when applied will enter cracks or fissures, causing soreness, and will be difficult to remove by the washing of the hands, always recommended after the cuticle-removing process is ended. The paste form will stay up where it is needed and will not enter cracks where it may become dangerous.

The liquid form is put up in bottles, which necessitates wrapping absorbent cotton on an orange stick, dipping in the bottle, and applying to the cuticle. The paste form can be put in a tin tube with a pointed spout having small opening, so that the remover can be applied directly to the cuticle from the tube. Although the orange stick and cotton can then be used, it is not necessary except where the cuticle is in very bad shape. A piece of absorbent cotton or a cloth will work the cuticle back and wipe off the excess cuticle.

I have tried soap solutions, using both caustic and potash soaps, but neither were satisfactory owing to the separation of the soap from water and caustic. I tried tragacanth, a gum which swells to a gelatinous mass in water and is used in face creams, and gelatine, but both of these substances were attacked by the potash, and thus lost their pasty consistency and became watery. I then ran a series of experiments with starch, using what is known as an alkaline starch, because these starches contain less nitrogenous impurities, these impurities being attacked by the alkali which is used in their manufacture and run off as waste during the process. I wished to make the remover with an alkaline strength of about two per cent, and so did not wish to have present in the starch any material with which potash (or potassium hydroxide, which gives the alkaline strength) could react to reduce the alkaline strength. In an alkaline starch any material of this kind would have already been attacked and removed. A non-alkaline starch might have worked just as well as the alkaline starch. I did not try the experiment, but would expect a less stable product from the non-alkaline variety.

Glycerine was added for the following reasons:

1. To prevent freezing of the remover in the tubes which would cause the water and starch to separate.

2. Glycerine has a softening and beneficial effect on the skin.

3. The tests showed that the more potash used the more watery was the resulting paste. Glycerine had the reverse effect and tended to help the forming of the paste. It was used therefore to counteract the effect of the potash.

4. The glycerine would help prevent the formation of a plug of hard material at the end of the tube.

It is not essential, however, that glycerine be added. A cuticle remover in paste form can be made from starch without the addition of glycerine.

The following facts are taken from Thorp's Dictionary of Applied Chemistry, article on Starch, vol. 5, page 149:

1. When starch is added to cold water nothing takes place, but when the water and starch are heated to a temperature which varies with the type of starch used the granules of starch swell up and a paste is formed.

2. The granules do not all swell up at once—the younger are attacked first—the older later.

3. When starch is treated with an alkaline solution the granules swell up—forming a solution in no way differing from that produced by the action of heat on the starch and water—the action of swelling by heat is the same as the action of swelling by caustic or potash.

4. When a moderately strong solution of potash is added to starch paste the previously opalescent liquid is rendered transparent without any alteration in viscosity. These facts point to the formation of a definite compound of starch with the potash.

The point noted in the above paragraph (4) was indicated by the fact that all our experimental batches on making quantitative tests for potash (potassium hydroxide) showed a smaller alkaline strength than there should have been according to the formulas used.

The fact that potash causes the paste cuticle remover to become transparent is an advantage as it makes a more attractive product.

I have run tests on various batches of paste cuticle remover several weeks after compounding, to see if the per cent of potash remained constant. It did, where a heat of 140 degrees F. or over was used in compounding, but the per cent potash dropped where less heat was used, showing what you would expect where a chemical reaction takes place (in this case between starch and the potash). That is, heat helps the reaction and the reaction was not completed at once where less heat was used, but was gradually completed later.

In speaking of "paste" in this specification and in the claims I mean to include a composition which is actually pasty, or merely viscous, or which at any rate does not run freely.

I claim:

1. A cuticle remover in homogeneous and substantially stable paste form comprising a solution of potash, and starch.

2. A cuticle remover in homogeneous and substantially stable paste form comprising a solution of potash and an alkaline starch.

3. A cuticle remover in homogeneous and substantially stable paste form comprising a solution of potash, starch, and glycerine.

4. A cuticle remover in homogeneous and substantially stable paste form comprising a solution of potash, an alkaline starch, and glycerine.

5. The method of making a cuticle remover in homogeneous and substantially stable paste form, which consists in mixing starch, potash and water, and heating the mixture slowly to a point above the starching temperature.

In testimony whereof I affix my signature.

RALPH KIRKMAN.